Nov. 27, 1956 G. G. ENSIGN 2,772,321
VOLTAIC CELL CATHODE AND ART OF MAKING THE SAME
Filed July 3, 1952
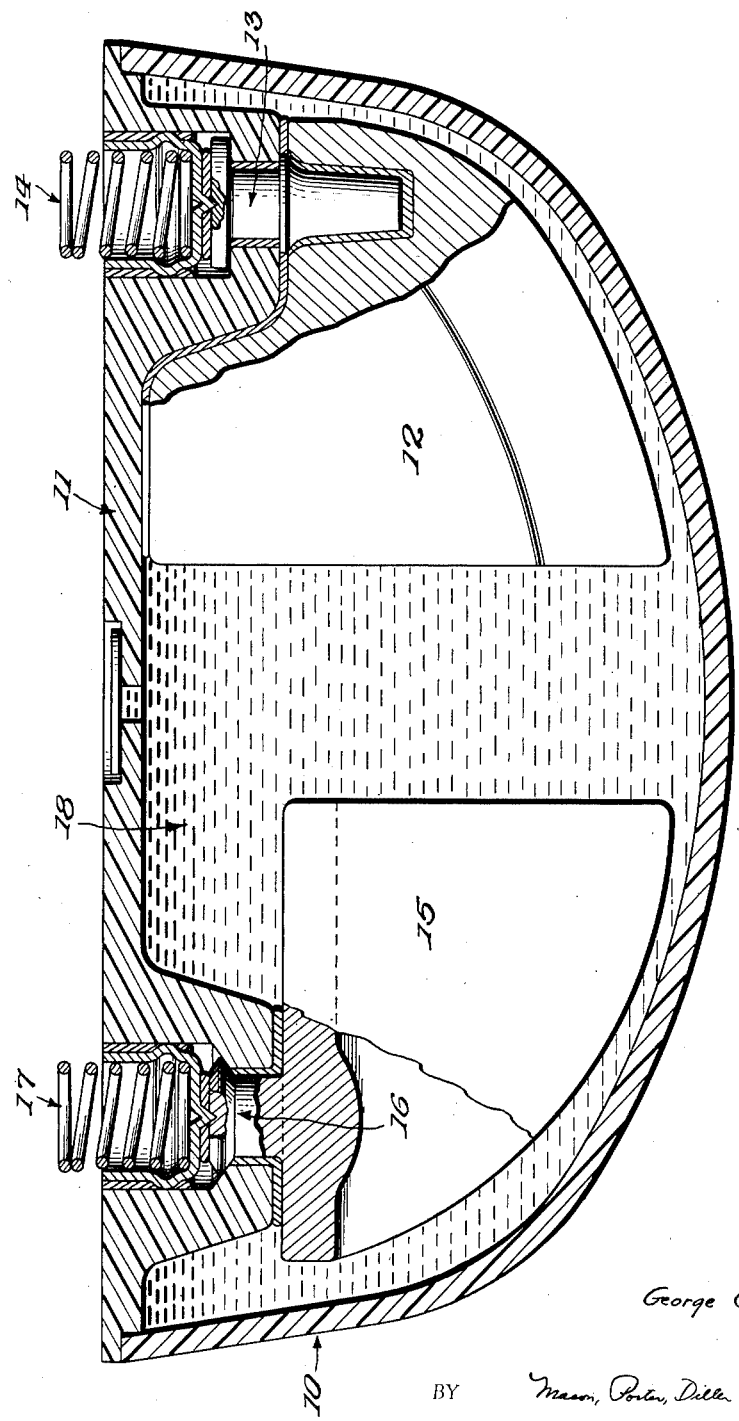
INVENTOR
George G. Ensign,
BY Mason, Porter, Diller + Stewart,
ATTORNEYS

United States Patent Office 2,772,321
Patented Nov. 27, 1956

2,772,321

VOLTAIC CELL CATHODE AND ART OF MAKING THE SAME

George G. Ensign, Elgin, Ill., assignor to Elgin National Watch Company, Elgin, Ill., a corporation of Illinois Application July 3, 1952, Serial No. 297,011

13 Claims. (Cl. 136—120)

This invention relates to cathode structures for electrical energy producing or voltaic cells, and a method of making the same.

A feature is the provision of a cathode structure for an electrical energy producing or voltaic cell including a granular material which is reduced in volume during cell action and a cementitious non-conductive composition effective to bind the granular material for strengthening the structure prior to and during use, and for preventing migration of the material throughout and after cell activity.

Another feature is the provision of a composite cathode structure including granules of reducible powdery material of low electrical conductivity, granules of conductive material, and a cementitious material effective to maintain the granular materials in coherent electrically-conductive form.

A further feature is the provision of a composite cathode structure including particles of a reducible metal oxide of low electrical conductivity, electrically conductive material to bind the reduced metal, and a cementitious material effective to maintain the reducible and conductive materials in coherent electrically-conductive form.

A further feature is the provision of a composite cathode structure including mingled particles of a reducible metal oxide of low electrical conductivity and of a conductive material effective during the initial part of cell activity to assure low internal resistance and effective during cell activity and after completion thereof to bind the reduced metal, and an electrically non-conductive cementitious material effective to bind the said metal oxide and the metal reduced therefrom, and the conductive material, in a form and volume maintaining condition.

A feature is the provision of a cathode including mercuric oxide and silver in mingled granular form, together with cementitious non-conductive material binding the granules into a coherent mass of electrically conductive nature.

A feature is the provision of a cathode including mercuric oxide and graphite in mingled granular form, together with cementitious non-conductive material binding the granules into a coherent mass of electrically conductive nature.

A further feature is the provision of a cathode including mercuric oxide, silver particles, graphite particles, and cementitious non-conductive material binding the particles into a coherent mass of electrically-conductive nature.

A feature is a process of making a composite cathode structure including active depolarizing particles of low electrical conductivity, particles of conductive material, and an electrically non-conductive cementitious material which can flow under pressure into coherent binding condition and position within the structure and therewith establish an electrically-conductive coherent mass.

With these and other features as objects in view, as will appear in the course of the following description and claims, an illustrative cell is shown in the drawing, employing a cathode formed in accordance with this invention.

In the drawing, a cell housing includes a case 10 and a closing cover 11 upon which is supported a cathode 12 having a conductive extension 13 leading to the outer terminal 14, and an anode 15 having an extension 16 leading to the outer terminal 17. The anode 15 in the illustration may be of zinc, tin or, preferably, indium. The cathode 12 must be conductive and exhibit an electromotive potential relative to the anode in the electrolyte 18 which illustratively is an alkaline solution such as 30 percent or 40 percent potassium hydroxide.

A further requirement for a cell of high volume or weight efficiency is that the cathode should function with electrochemical stability under a given load and yield a useful total quantity of electricity closely conforming to the theoretical change of valency of the cathode material. During the useful life of the cell, the formation of gaseous hydrogen must be prevented, both to avoid polarization effects and cessation of cell action and also to avoid internal pressure troubles in a sealed cell.

A preferred cathode structure therefore includes depolarizing material such as a metal oxide that undergoes reduction during cell action, and thereby prevents the evolution of hydrogen. Mercuric oxide has been proposed and used for the purpose, but has the disadvantages of very low electrical conductivity, the severance even during storage of oxide particles which migrate to the anode thus reducing the electrochemical efficiency and tending to establish excessive amalgamation at the anode, and the formation upon reduction of metallic mercury which migrates and coalesces and often establishes an internal short circuit between the cathode and anode.

It has been proposed to employ a mixture of mercuric oxide powder and silver powder as a cathode mass, wherewith the reduced mercury amalgamates with and is bound by the silver; but such cathodes are difficult to form and tend to disintegrate during the course of cell action, wherewith the amalgamated particles move within the electrolyte to cause local exhausting action at the anode or even to form a short circuit from cathode to anode. This difficulty is especially exhibited toward the end of cell life, as the reduction of the mercuric oxide has produced a large proportion of mercury and the amalgam is very soft: and this trouble cannot always be avoided by increasing the relative amount of silver because, when the maximum cathode volume is fixed, increase of silver means decrease of effective depolarizer and consequent loss of volumetric efficiency. Another practice has been to employ barriers or filter-like supports or diaphragms, of cotton linters or other material, for physically preventing migration of reduced cathode materials to the anode: but here again the volume necessarily occupied by the barriers subtract from the volumetric efficiency, and broken unreduced cathodic masses which are not momentarily in conductive relation to the cathode leadout represent losses. A further practice is to employ a substance which thickens the electrolyte into a gel which resists migration of cathodic material: this gel-former represents a loss of effective volume.

According to the present invention, the granular electrode materials are immobilized throughout the cell action by use of a cementitious material of non-conductive nature which, during the process of forming and molding the cathode, binds the particles into a coherent mass of desirable electrically-conductive properties. The process of forming includes the employment of conductive materials to bring the cementitious material into its conduction-permitting condition, while the cementitious material acts in effect as a lubricant to permit the making of a highly compacted mass having a porosity effective for absorption of aqueous fluids. In the preferred practice, graphite particles are included for added conductivity during the cathode action and for added lubricating effect during the forming.

A composite cathode can be made by blending 5 parts of silver powder, 2 parts of graphite, and 92 parts of mercuric oxide, and bonding by 1 part of a plastic resistant to the electrolyte, the proportion being by weight. The silver is preferably made by precipitation and drying as an impalpable powder, which is bolted to exclude any aggregates coarser than 600 mesh. The graphite and mercuric oxide are prepared of similar fineness: and the three powders are blended by shaking and bolting. The plastic, such as polyvinyl formal, is taken up in a volatile solvent such as ethylene dichloride as a 10 percent solution. The computed quantity is measured and added to the powdery mass while triturating, and with use of excess solvent to wash out the measuring vessel and increase the fluidity of the mass. The solvent is evaporated out, and the dried mass is comminuted to a fineness of 50 mesh and below. The particles are placed in a mold and subjected at room temperature to high pressure such as over 30,000 pounds per square inch, during which the plastic and graphite act as lubricants in aiding the effective compacting of the mass, while the harder particles appear to pierce the plastic septa to establish conductivity by the silver and graphite components. The plastic components flow toward and weld to one another so that the molded cathode is a coherent porous mass which is adequately conductive at initial operation and remains coherent while the mercuric oxide is being reduced to metal form and amalgamates with the silver but is held by the plastic.

Alternatively, the process can be practiced by incorporating the finely powdered plastic with the other solids by trituration, introducing solvent during the trituration, drying, and molding at the above pressure: or the mercuric oxide, silver and graphite particles can be mixed and molded to shape; then impregnated with a solution of polyvinyl formal, e. g. as a 2 to 5 percent solution in ethylene dichloride, with evacuation and release to assist in penetration; and finally the cathode structure is dried to effect elimination of the solvent.

The quantity of plastic cementitious component, by weight, must be sufficient to provide a connected sponge-like sub-structure, and about 4 percent by weight has been found a tolerable maximum. Thus when made by incorporation before molding, about ½ percent to about 4 percent is satisfactory, with preference for 1 to 2 percent from volume considerations; with impregnation of the molded mass, less final plastic is effective. At the lower end of the range, the mass is of less structural strength but can be used when a small cathode is held in position otherwise than by its own tensile strength. At the upper end of the range, the conductivity is low and the internal resistance of the cell high, and the volume efficiency low.

Other materials may be substituted for the polyvinyl formal solution. For examples, polyvinyl acetal, polyvinyl butyral, polyvinyl chlorides, polyethylene of low molecular weight, alkali resistant silicones, polystyrene and various mixtures of the described materials may be employed: and when used in dissolved form, solvents such as trichlorethylene, dichlorethylene, dioxane, cyclohexanone, and solvent mixtures can be used. General characterizations of the plastic component are that it is resistant to strong alkali solutions, such as 30 or 40 percent potassium hydroxide, and remains coherent and effective in the presence of such solutions and the conversion products of the voltaic cell for periods of a year or more: that it partakes during molding in the consolidation of the mass and, although itself essentially electrically non-conductive, forms a network or spongy sub-structure of connected septa through which conduction can occur: and that it is of such behavior when present in the stated low proportion that adequate porosity is provided by connected channels for electrolyte penetration.

The pressure employed during molding should not be significantly less than 30,000 pounds per square inch. The dry resistance of molded cathodes may have a comparative value of over 100 when made at 10,000 p. s. i., but only 10 to 15 at 30,000 p. s. i., and below 10 at 60,000 p. s. i.: in many instances, little further reduction has occurred with a molding pressure of 120,000 p. s. i. The porosity with a molding pressure of 10,000 p. s. i. may be 25 percent; with 30,000 p. s. i. around 12 to 15 percent; with 60,000 p. s. i. around 5 to 10 percent; and with 120,000 p. s. i. around 4 to 6 percent.

The quantity of silver, by weight, may vary from about 5 percent to about 12 percent of the mercuric oxide. At the lowest part of the range, the initial conductivity is low in the absence of graphite and a preliminary run for electrical forming may be necessary, and the amalgam is very soft at the end of the cell action. At the highest part of the range, the volume efficiency is low because of the relatively low quantity of mercuric oxide.

The graphite is of great value in the molding operation and to assure initial conductivity at low amounts of silver, and therewith contributes to the over-all volume efficiency. Above 5 percent, no greater effect appears; and the useful range is about 1 to 4 percent by weight, preferably around 1 to 2.

The preferred proportions of the above example have a high volumetric efficiency, noting that the plastic and the graphite have a volume/weight value of about 4 compared with unity value for mercuric oxide and silver.

Other examples of composition are:

(a) 10 percent silver, 5 percent graphite, 2 percent plastic, remainder mercuric oxide;

(b) 10 percent silver, 5 percent graphite, 1 percent plastic, remainder mercuric oxide;

(c) 3 percent silver, 2 percent graphite, 2 percent plastic, remainder mercuric oxide;

(d) 10 percent silver, 1 percent plastic, remainder mercuric oxide;

(e) 5 percent silver, 2 percent graphite, 1 percent plastic, remainder mercuric oxide;

(f) 5 percent graphite, 1 percent plastic, remainder mercuric oxide, noting that 2 percent plastic may be substituted.

The internal resistance of a cell may be 20 ohms with a cathode composition of 10 percent silver, 5 percent graphite, and 2 percent plastic, remainder mercuric oxide; whereas at 3 percent silver, 2 percent graphite, 2 percent plastic, remainder mercuric oxide, the resistance rises to 60 ohms. When such a cell is employed in a device such as an electrically actuated watch having a coil with resistance of 400 ohms, an internal resistance of 20 ohms means an efficiency loss of 5 percent, while a resistance of 60 ohms means a loss of 15 percent.

Specimen cells employing the composite cathode, and working in 40 percent potassium hydroxide solution, with an indium anode, have shown initial open circuit voltages of about 1.14 to 1.15 and a substantially constant working voltage of 1.10 when discharged through a resistance of 200 ohms in a pulse cycle in which the cell terminals are connected to the resistance for 2 percent of cycle time at a cycle rate of five per second. At the end of cell activity, the voltages dropped rapidly; such cells illustratively have yielded 82.2 percent, 84.2 percent, 89.9 percent, 93.4 percent of the theoretical energy when the open circuit voltage has dropped to 0.9 volt.

The illustrative forms are not restrictive, and the invention may be practiced in many ways within the scope of the appended claims.

What is claimed is:

1. A cathode structure including about 3 to 12 percent by weight of fine silver particles, 1 to 4 percent by weight of graphite particles, about ½ to 4 percent of plastic resistant to the electrolyte, and the remainder particles of mercuric oxide, the plastic forming a connected network within the structure, the particles being intimately mixed and in conductive relation to one another, said structure being a compact mass having a porosity effective for the absorption of aqueous liquids.

2. A cathode structure for an electrical energy producing cell including for the reactive and conductive mass 5 parts by weight of silver particles, 2 parts of graphite particles, and 92 parts of mercuric oxide particles, together with about 1 part of an alkali-solution resistant plastic forming a spongy connected network within the structure and effective to prevent migration of reduced mercury from the structure, said structure having 4 to 15 percent of its volume as connected pores.

3. The process of making a coherent cathode structure which comprises mixing particles of reducible metal oxide of low conductivity, and silver particles with about ½ to 4 percent by weight of a cold-deformable plastic resistant to the electrolyte, in the presence of a solvent for the plastic, eliminating the solvent, and molding at a pressure exceeding 30,000 pounds per square inch to compact and to form the mass with connected channels for electrolyte penetration, the porosity of the mass being 4 to 15 percent of the volume, and with the particles in conductive relation with one another.

4. The The process of making a coherent cathode which comprises mixing about ½ to 4 percent by weight of a cold-deformable plastic resistant to the electrolyte, about 3 to 12 percent by weight of silver particles, with particles of mercuric oxide, in the presence of a solvent for the plastic, eliminating the solvent, and molding at a pressure exceeding 30,000 pounds per square inch to compact and to form the mass with connected channels for electrolyte penetration, the porosity of the mass being 4 to 15 percent of the volume, and with the particles in conductive relation with one another.

5. The process of making a coherent cathode which comprises preparing a mixture of about 3 to 12 percent by weight of silver particles, 1 to 4 percent of graphite particles and the remainder particles of mercuric oxide, reducing the mixture to a powder not coarser than 600 mesh, introducing about ½ to 4 percent by weight of polyvinyl formal in the presence of a solvent thereof, eliminating the solvent, and molding at room temperature at a pressure exceeding 30,000 pounds per square inch to compact and to form the mass with connected channels for electrolyte penetration, the porosity of the mass being 4 to 15 percent of the volume, and with the particles in conductive relation with one another.

6. A coherent and self-supporting cathode structure for an electrical energy producing cell including particles of reducible metal oxide of low conductivity, conductive particles, and ½ to 4 percent by weight of electrolyte-resistant plastic forming a connected network within the structure, said structure being a compressed compact mass having a porosity below 15 percent and effective for the absorption of aqueous liquids and said conductive particles being in conductive relation with one another and held by the plastic against separation and migration.

7. A coherent and self-supporting cathode structure for an electrical energy producing cell including particles of depolarizing material which decreases in volume during its depolarizing action, conductive particles, and ½ to 4 percent by weight electrolyte-resistant plastic forming a connected network within the structure, said structure being a compressed compact mass having a porosity below 15 percent and effective for the absorption of aqueous liquids and said conductive particles being in conductive relation with one another and held by the plastic against separation and migration.

8. A coherent and self-supporting cathode structure for an electrical energy producing cell consisting of particles of reducible metal oxide of low conductivity, particles of conductive material, and an electrically non-conductive electrolyte-resistant plastic capable of flowing under pressure and constituting a connected network within the structure, the particles being intimately mixed and in conductive relation to one another, said structure being a compressed compact mass having a porosity below 15 percent and effective for the absorption of aqueous liquids, said plastic being present in the amount of ½ to 4 percent of the mass and effective for preventing for preventing separation and migration of parts of the structure.

9. A coherent and self-supporting cathode structure as in claim 1, in which the structure has 4 to 15 percent of pores constituting connected channels for electrolyte penetration.

10. A coherent and self-supporting cathode structure for an electrical energy producing cell including particles of mercuric oxide, silver particles, and electrolyte-resistant plastic forming a connected network within the structure, the particles being intimately mixed and in conductive relation to one another, said structure being a compressed compact mass having a porosity below 15 percent and effective for the absorption of aqueous liquids, said plastic being present in the amount of ½ to 4 percent of the mass and effective for preventing separation and migration of parts of the structure.

11. A coherent and self-supporting cathode structure for an electrical energy producing cell including particles of mercuric oxide, graphite particles, and electrolyte-resistant plastic forming a connected network within the structure, the particles being intimately mixed and in conductive relation to one another, said structure being a compressed compact mass having a porosity below 15 percent and effective for the absorption of aqueous liquids, said plastic being present in the amount of ½ to 4 percent of the mass and effective for preventing separation and migration of parts of the structure.

12. A coherent and self-supporting cathode structure for an electrical energy producing cell including particles of mercuric oxide, silver particles, graphite particles, and electrolyte-resistant plastic forming a connected network within the structure, the particles being intimately mixed and in conductive relation to one another, said structure being a compressed compact mass having a porosity below 15 percent and effective for the absorption of aqueous liquids, said plastic being present in the amount of ½ to 4 percent of the mass and effective for preventing separation and migration of parts of the structure.

13. A coherent and self-supporting composite cathode structure for an electrical energy producing cell, comprising particles of depolarizing material which decreases in volume during its depolarizing action and is of relatively low electrical conductivity, particles of material of relatively high electrical conductivity, and ½ to 4 percent by weight of electrolyte-resistant plastic capable of flowing under pressure into coherent binding condition and forming a connected network of connected septa within the electrically-conductive coherent cathode mass, said cathode being a compressed compact mass having a porosity of 4 to 15 percent and effective for the absorption of aqueous liquids and said particles being intimately mixed and in conductive relation with one another and held by the plastic against separation and migration.

References Cited in the file of this patent

UNITED STATES PATENTS

| | | |
|---|---|---|
| 2,275,281 | Berl | Mar. 3, 1942 |
| 2,422,045 | Ruben | June 10, 1947 |
| 2,473,546 | Ruben | June 21, 1949 |
| 2,658,935 | Chubb | Nov. 10, 1953 |